Feb. 24, 1970   A. B. BROERMAN   3,496,763
LIQUID STREAM ANALYSIS
Filed Oct. 19, 1967

INVENTOR.
A. B. BROERMAN
BY Young & Quigg
ATTORNEYS

_United States Patent Office_

3,496,763
Patented Feb. 24, 1970

3,496,763
LIQUID STREAM ANALYSIS
Arthur B. Broerman, Bartlesville, Okla., assignor to Phillips Petroleum Company, a corporation of Delaware
Filed Oct. 19, 1967, Ser. No. 676,441
Int. Cl. G01n *11/00*
U.S. Cl. 73—61.1                3 Claims

ABSTRACT OF THE DISCLOSURE

Changes in composition of a liquid stream are detected by impinging the stream on a temperature sensitive transducing element in a stream of flowing gas under conditions such that evaporation of the liquid occurs, and measuring changes in the amount of cooling which results from the vaporization of the liquid. This method is particularly useful in measuring changes in composition of the effluent from a chromatographic column wherein a liquid is used as the carrier fluid.

---

This invention relates to the analysis of liquid streams. In another aspect it relates to improved detectors for use with chromatographic analyzers employing liquids as the carrier fluid.

In various industrial and laboratory operations there is a need for instruments which are capable of detecting changes in composition of liquid streams. One such need occurs, for example, in the field of chromatography wherein liquids are employed as the carrier fluid. It is generally believed that chromatographic analyzers of this type have considerable potential, but thus far such analyzers have not been used extensively because of difficuties encountered in measuring changes in composition of the effluent liquid streams. Most of the detectors employed heretofore have required large samples or have been quite complex in operation and lacking in sensitivity.

In accordance with the present invention, a simple and reliable analyzer is provided which is capable of detecting changes in composition of liquid streams. A stream of liquid to be analyzed is impinged on a temperature sensitive transducer, such as a thermistor, under conditions such that evaporation of the liquid occurs. In this manner, changes in cooling of the transducer resulting from changes in composition of the liquid provide an indication of the liquid composition. The analyzer can be employed to advantage as a detector for use in chromatography wherein a liquid is employed as the carrier fluid.

Accordingly, it is an object of this invention to provide a novel method of and apparatus for analyzing liquid streams.

Another object is to provide an improved detector for use with chromatographic analyzers employing liquid as the carrier fluid.

Other objects, advantages and features of the invention should become apparent from the following detailed description which is taken in conjunction with the accompanying drawing in which.

Figure 1:
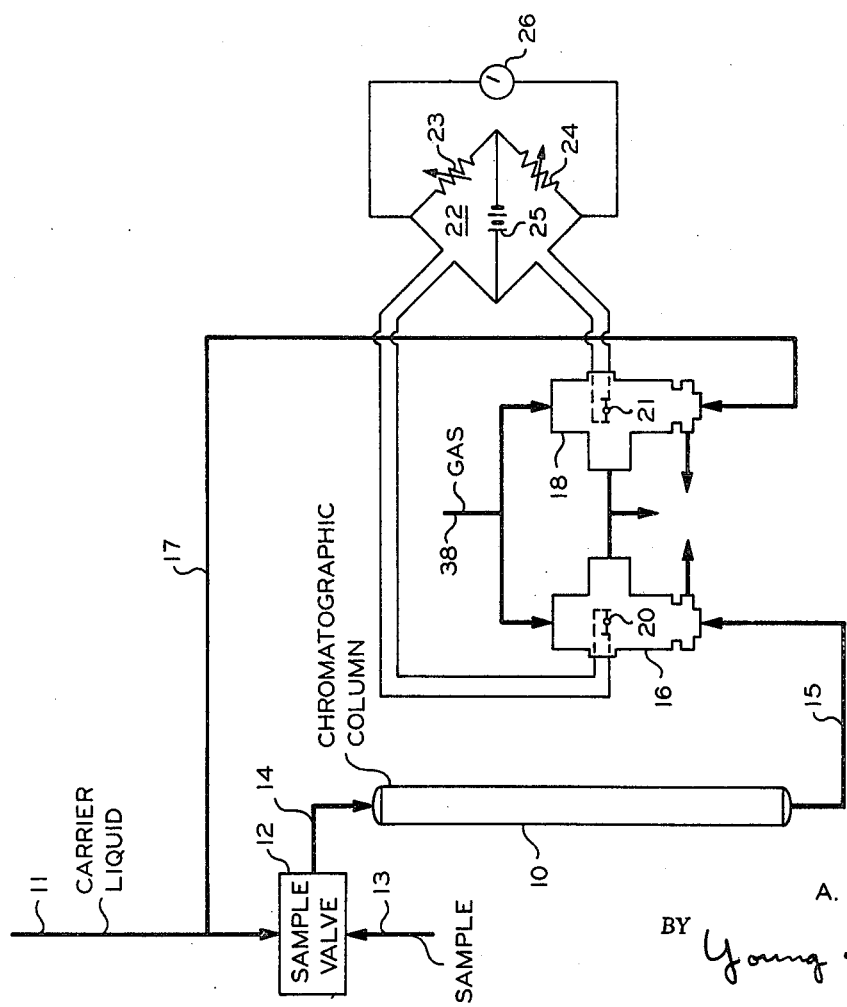
FIGURE 1 is a schematic representation of a chromatographic analyzer having a pair of the detectors of this invention incorporated therein.

Referring now to the drawing in detail and to FIGURE 1 in particular, there is shown a chromatographic column 10 which contains a suitable packing material for use with a liquid carrier fluid. Such a fluid is introduced through a conduit 11 which communicates with the inlet of a sample valve 12. A liquid sample to be anlyzed is introduced into valve 12 through a conduit 13. The effluent from valve 12 is passed through a conduit 14 to the inlet of column 10. The effluent from column 10 is directed through a conduit 15 to a first detector 16. A portion of the carrier liquid is passed from conduit 11 through a contduit 17 to a reference detector 18.

The apparatus thus far described, with the exception of the specific detectors of this invention, which are described in detail hereinafter, forms a conventional chromatographic analyzer. The carrier liquid alone initially flows through column 10 to detector 16 and through conduit 17 to detector 18. The flows through these two paths normally are equilized by the use of suitable flow controllers, not shown, such that both detectors initially receive the liquid under identical flow conditions. Sample vale 12 is actuated periodically to introduce a predetermined volume of sample into the system. The components of the sample are eluted in sequence from column 10 and thus appear sequentially in the effluent which is passed to detector 16. Changes in composition of this effluent are detected by suitable means to provide an output signal which is indicative of the composition of the sample material.

As will be described hereinafter in greater detail, detectors 16 and 18 are provided with respective thermistors 20 and 21 which are employed as the sensing elements. These two thermistors are connected in adjacent arms of a Wheatstone bridge 22. Resistors 23 and 24 form the remaining arms of the bridge. A voltage source 25 is connected across first opposite terminals of the bridge, and a detector 26 is connected across second opposite terminals.

Figure 2:
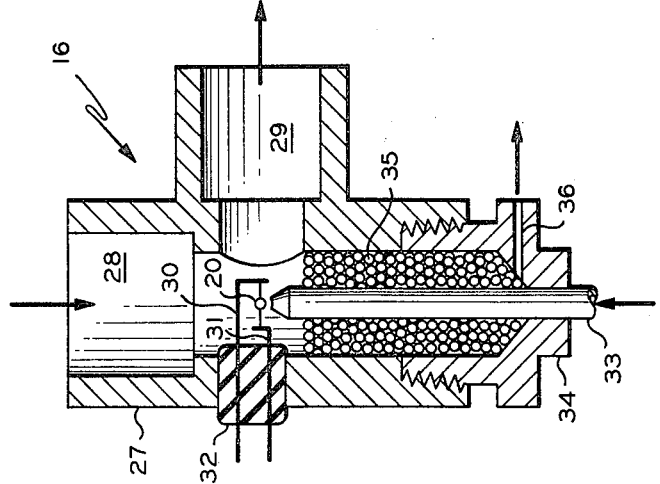
FIGURE 2 is a detailed view, shown partially in section, of a detector employed in the apparatus of FIGURE 1.

Detector 16 is illustrated in detail in FIGURE 2. The detector comprises a housing 27 which is provided with an inlet port 28 and an outlet port 29 to permit air or other gas to be circulated through the housing. Thermistor 20 is mounted within housing 27 by support electrodes 30 and 31 which extend through an insulating plug 32. A capillary tube 33 is mounted within housing 27 such that the end of the tube is immeately adjacegnt thermistor 20. Tube 33 is retained in this position by a bushing 34 which is threaded to housing 27. The liquid effluent from column 10 of FIGURE 1 is introduced into the detector through tube 33 such that the liquid stream impinges directly on thermistor 20. Glass beads or other packing material 35 are disposed within the housing so as to surround tube 33. A drain opening 36 in bushing 34 communicates with the interior of the housing adjacent the bottom of beads 35.

The liquid stream which flows through tube 33 impinges on thermistor 20 and is at least partially evaporated on the surface of the thermistor. The resulting evaporization exerts a cooling effect on the thermistor, and this in turn influences the resistance of the thermistor. Changes in composition of the liquid stream result in different amounts of cooling, whereby changes in resistance of the thermistor are indicative of changes in composition of the liquid stream. The interior of housing 27 is maintained under conditions such that evaporation of the liquid takes place on the thermistor. This is readily accomplished by circulating air or other gas through the interior of housing 27. As illustrated in FIGURE 1, such a gas can be introduced into the tops of detectors 16 and 18 (through port 28 as shown in FIGURE 2) from a conduit 38. Liquid which is not evaporated within housing 27 flows downwardly outside tube 33 and is removed through drain conduit 36. Packing material 35 is provided to offer a high resistance path to the air circulated through the housing so as to minimize evaporation in the region surrounding tube 33. Otherwise, evaporation in this region would tend to cool the incoming liquid stream and result in erratic output signals. Gas should be introduced through conduit 38 at constant conditions of temperature and flow in order to prevent changes in gas temperature or flow from changing the temperature of thermistor 20. This can be accomplished by use of conventional flow and temperature control means, not shown.

As illustrated in FIGURE 1, two detectors 16 and 18 are employed to advantage in the analysis of the chromatographic column effluent. With carrier liquid alone flowing through both detectors, bridge 22 can be balanced to provide a zero output signal. Any subsequent unbalance of the bridge is thus indicative of changes in composition of the effluent from column 10. This is measured by detector 26, which can be a recorder, to provide a conventional chromatogram.

While this invention has been described in conjunction with detecting changes in composition of the effluent from a chromatographic column, it should be evident that the invention is not so limited. The detector of FIGURE 2 can be employed in any situation wherein it is desired to measure changes in composition of liquid streams. For example, such a detector can be employed to monitor the flow of fluids through a pipeline to detect interfaces. Another application is the monitoring of a process stream to determine changes in composition resulting from off-specification product being produced. The detector of FIGURE 2 does not require any substantial volume of liquid. In fact, it operates quite effectively with very small flow rates. Excellent results have been obtained with tube 33 being a ten mil capillary tube. If the desired liquid flow through column 10 is greater than the flow needed in the detector, a portion of the column effluent can be vented. The detector of this invention is particularly useful in chromatographic analyzers because the electrical output can be utilized in the same manner as is the output from thermal conductivity cells which are commonly employed in gas phase chromatography.

While this invention has been described in conjunction with a presently preferred embodiment, it should be evident that it is not limited thereto.

What is claimed is:

1. Apparatus for use in detecting changes in composition of a liquid stream comprising:
   a temperature sensitive transducing element;
   means to direct a stream of liquid to be analyzed on said element; and
   means adapted to maintain said element in an atmosphere such that evaporation of liquid takes place at the surface of said element, whereby changes in composition of the liquid being analyzed change the temperature of said element;
   wherein said means adapted to maintain said element in an atmosphere comprises a housing having said transducing element positioned therein, and means adapted to pass a stream of gas through said housing in contact with said element so that the flow of gas assists in evaporating liquid at the surface of said element.

2. The apparatus of claim 1 wherein said means to direct a stream of liquid comprises a tube which extends into said housing to a point in closely spaced relationship with said transducing element, said housing being provided with an outlet passage surrounding said tube to permit withdrawal of liquid which does not evaporate on the surface of said element, and packing means positioned in said outlet passage to resist flow of gas therethrough.

3. The method of detecting changes in composition of a liquid stream which comprises impinging the stream on a temperature sensitive transducing element, maintaining the element in an atmosphere such that evaporation of liquid takes place at the surface of the element by passing a stream of gas in contact with the transducing element to assist in evaporating liquid on the surface thereof, and measuring changes in temperature of the element resulting from changes in composition of the liquid stream being detected.

References Cited
UNITED STATES PATENTS

| | | | |
|---|---|---|---|
| 3,080,746 | 3/1963 | Nerheim | 73—61.1 |
| 3,097,518 | 7/1963 | Taylor et al. | 73—27 |
| 3,097,520 | 7/1963 | Thompson | 73—27 |
| 3,184,953 | 5/1965 | Petrocelli | 73—27 X |
| 3,243,991 | 4/1966 | König et al. | 73—27 |
| 3,264,862 | 8/1966 | Felton et al. | |
| 3,333,183 | 7/1967 | Larrison | 73—23.1 |
| 3,405,550 | 10/1968 | Bloch | 73—61.1 |

LOUIS R. PRINCE, Primary Examiner

J. W. ROSKOS, Assistant Examiner

U.S. Cl. X.R.

210—31